June 18, 1946.   A. J. FLYNN, JR   2,402,322
ANTITIPPING DEVICE FOR INFANT'S VEHICLES
Filed April 25, 1945
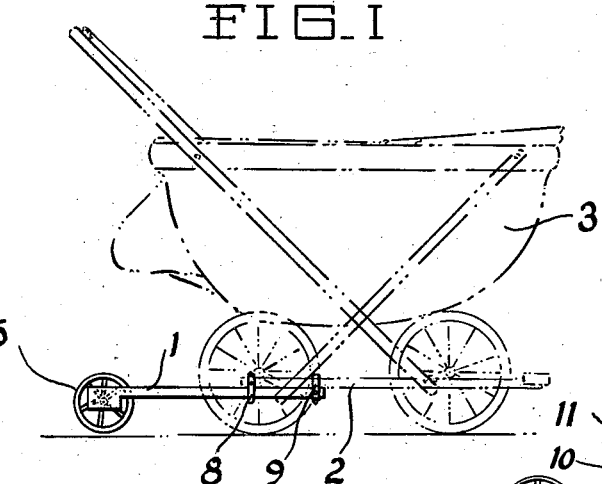
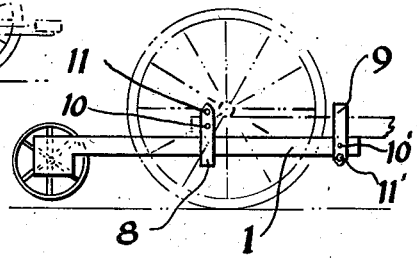
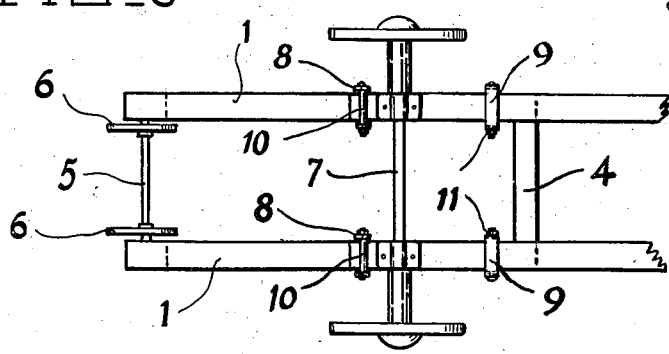
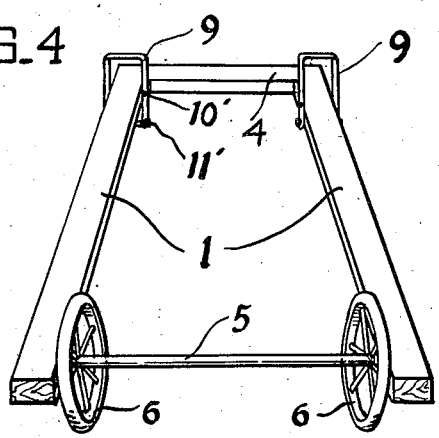
INVENTOR
ANDREW J. FLYNN JR.
BY *Harry C. Schroeder*
HIS ATTORNEY Patented June 18, 1946

2,402,322

UNITED STATES PATENT OFFICE 2,402,322

ANTITIPPING DEVICE FOR INFANTS' VEHICLES

Andrew J. Flynn, Jr., Lafayette, Calif.

Application April 25, 1945, Serial No. 590,230

4 Claims. (Cl. 280—150)

This invention relates to perambulators or baby carriages which have a tendency to tip over backwards when the weight therein is badly distributed, as when the child moves back from its proper position and reaches for the handles when the perambulator is unattended.

The major object of the invention is to provide an attachment for a perambulator which will insure against such tipping. At the same time, nothing in the attachment prevents normal manipulation and steering of the perambulator.

Another object is to provide an attachment for the purpose which may be readily mounted on a conventional perambulator.

Fig. 1 is a side outline of a conventional perambulator, showing the safeguarding attachment applied thereto.

Fig. 2 is a somewhat enlarged side elevation of the attachment.

Fig. 3 is a top plan view of the attachment as mounted on the perambulator.

Fig. 4 is a rear-end perspective view of the attachment, detached.

Referring to the numerals of reference on the drawing, the attachment comprises a horizontal frame which includes side rails 1, spaced apart the same as the bottom frame members 2 of a conventional perambulator or baby carriage 3. At their forward end, the rails 1 are connected by a cross bar 4, and at their rear end by an axle 5 on which relatively small wheels 6 are mounted, these wheels being inside rails 1.

The rails 1 are designed to underlap the members 2 for some distance from their rear end, or to a point ahead of the rear axle 7 of carriage 3. Rails 1 at their rear end are then disposed some distance rearwardly of the body of carriage 3 as shown in Fig. 1.

The rails are rigidly but detachably connected to frame members 2 by straddling U-clips 8 and 9 on each side; clips 8 being rearwardly of axle 7 and attached to members 2 by bolts 10, and the cross clamping bolts 11 on top; while the clips 9 are ahead of said axle and are mounted on rails 1 by bolts 10' and cross bolts 11' below as clearly shown.

When rails 1 are thus secured to frame members 2, the wheels 6 are then clear of the ground somewhat as shown, Figs. 1 and 2, so as not to interfere with the operation and steering of the carriage. At the same time, with only a slight backward tipping of the carriage, the wheels will engage the ground and limit the tipping movement.

The longitudinal position of wheels 6 may be altered by sliding the rails 1 along members 2 one way or the other and are held in alignment by U-clips 8 and 9.

I claim:

1. An attachment for a baby carriage to prevent backward tipping thereof, said carriage having longitudinal horizontal side frame members; the attachment comprises a horizontal frame including side rails adapted to be engaged for the forward portion of their length against the underside of the members, means to detachably secure the rails to said members and wheels normally clear of the ground, supported by the rails adjacent their rear end and rearwardly of the rear wheels of the carriage.

2. An attachment for a baby carriage to prevent backward tipping thereof, said carriage having longitudinal horizontal side frame members; the attachment comprises a horizontal frame including side rails adapted to be engaged for the forward portion of their length against the underside of the members, means to detachably secure the rails to said members and wheels normally clear of the ground, supported by the rails adjacent their rear end and rearwardly of the rear wheels of the carriage in which said rail securing means is arranged to allow of longitudinal adjustment of the rails relative to the frame members.

3. An attachment for a baby carriage to prevent backward tipping thereof, said carriage having longitudinal horizontal side frame members; the attachment comprises a horizontal frame including side rails adapted to be engaged for the forward portion of their length against the underside of the members, means to detachably secure the rails to said members and wheels normally clear of the ground, supported by the rails adjacent their rear end and rearwardly of the rear wheels of the carriage in which said rail securing means comprises, for each rail, a pair of longitudinally spaced clamping U-clips straddling the rails and members; the rear clip being secured on the adjacent member and the forward clip being secured on the rail.

4. An attachment for a baby carriage having longitudinal frame members; comprising a frame including parallel side rails adapted for a part of their length and in their forward portions to be engaged in contact with said frame members, means to secure said rails to said members, and wheels rotatably mounted at the rear of said frame and carried thereby, said wheels disposed rearwardly of the rear wheels of the cariage and normally clear of the ground.

ANDREW J. FLYNN, Jr.